(12) United States Patent
Mancarella et al.

(10) Patent No.: US 9,605,757 B2
(45) Date of Patent: Mar. 28, 2017

(54) METHOD FOR ESTIMATING TORQUE DOWNSTREAM OF A VEHICLE TRANSMISSION

(71) Applicant: CNH Industrial America, LLC, New Holland, PA (US)

(72) Inventors: Francesco Mancarella, Brindisi (IT); Matteo Venturelli, Serramazzoni (IT); Gabriele Morandi, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/647,566

(22) PCT Filed: Nov. 28, 2013

(86) PCT No.: PCT/EP2013/075008
§ 371 (c)(1),
(2) Date: May 27, 2015

(87) PCT Pub. No.: WO2014/083125
PCT Pub. Date: Jun. 5, 2014

(65) Prior Publication Data
US 2015/0314788 A1 Nov. 5, 2015

(30) Foreign Application Priority Data
Nov. 29, 2012 (IT) .............................. MO2012A0298

(51) Int. Cl.
*F16H 47/04* (2006.01)
*F16H 63/50* (2006.01)
(Continued)

(52) U.S. Cl.
CPC ............. *F16H 63/50* (2013.01); *B60W 10/30* (2013.01); *B60W 30/1888* (2013.01);
(Continued)

(58) Field of Classification Search
CPC ......... B60W 10/30; B60W 2510/0657; B60W 2510/1025; B60W 2510/305;
(Continued)

(56) References Cited

U.S. PATENT DOCUMENTS 7,337,870 B2 * 3/2008 Izukura ................... F16H 59/06
                                                180/307
7,824,290 B1 * 11/2010 Brookins ................. B60K 6/12
                                                475/107
(Continued)

FOREIGN PATENT DOCUMENTS

| DE | 102006055725 A1 | 5/2008 |
| DE | 102009026625 A1 | 12/2010 |
| WO | WO 2012/110615 A1 | 8/2012 |

OTHER PUBLICATIONS

PCT International Search Report and Opinion, Dated Jan. 22, 2014 (7 Pages).

*Primary Examiner* — Tyler J Lee
(74) *Attorney, Agent, or Firm* — Richard K. DeMille; Rebecca L. Henkel

(57) ABSTRACT

A method for estimating torque transmitted to a structure located downstream of a transmission system of a vehicle is disclosed. The vehicle comprises an engine for generating torque, a transmission system configured to transmit a fraction of the torque generated by the engine to a plurality of wheels of the vehicle, and a further fraction of the torque generated by the engine to the structure. The transmission system includes a shaft arrangement interposed between the engine and the structure, a planetary gearing supported by the shaft arrangement, and a transmission unit arranged in parallel to the shaft arrangement. The torque transmitted to the structure is estimated on the basis of a group of parameters which comprise torque upstream of the transmission system, twist of the shaft arrangement, and a parameter (Continued)

which is indicative of the ratio between an output rotational speed at an output of the transmission unit and an input rotational speed at an input of the transmission unit.

20 Claims, 5 Drawing Sheets

(51) Int. Cl.
*B60W 30/188* (2012.01)
*B60W 10/30* (2006.01)
*F16H 59/16* (2006.01)
*F16H 59/68* (2006.01)

(52) U.S. Cl.
CPC ............. *F16H 47/04* (2013.01); *F16H 59/16* (2013.01); *B60W 2510/0657* (2013.01); *B60W 2510/1025* (2013.01); *B60W 2510/305* (2013.01); *F16H 2059/6853* (2013.01)

(58) Field of Classification Search
CPC .......... B60W 30/1888; F16H 61/66259; F16H 61/66; F16H 2059/6853; F16H 47/04; F16H 59/16; F16H 63/50
USPC .............................. 701/36, 50, 51; 477/48, 51
See application file for complete search history.

(56) References Cited

U.S. PATENT DOCUMENTS

| | | | |
|---|---|---|---|
| 8,639,419 B2* | 1/2014 | Roli | F16H 61/4157 477/48 |
| 8,920,276 B2* | 12/2014 | Henderson, Jr. | F16H 47/04 475/31 |
| 2004/0209718 A1* | 10/2004 | Ishibashi | B60W 10/103 474/18 |
| 2006/0230920 A1* | 10/2006 | Berg | B60W 30/1819 91/499 |
| 2008/0190103 A1* | 8/2008 | Behm | B60W 10/196 60/460 |
| 2008/0234089 A1* | 9/2008 | Prebeck | B60K 17/34 475/83 |
| 2010/0022348 A1 | 1/2010 | Jonsson | |
| 2010/0087993 A1* | 4/2010 | Roli | F16H 61/4157 701/51 |
| 2014/0248986 A1* | 9/2014 | Weeramantry | F16H 47/04 475/59 |
| 2014/0256491 A1* | 9/2014 | Henderson, Jr. | F16H 47/04 475/31 |
| 2015/0307077 A1* | 10/2015 | Xing | B60W 10/06 701/50 |

* cited by examiner

Fig. 2
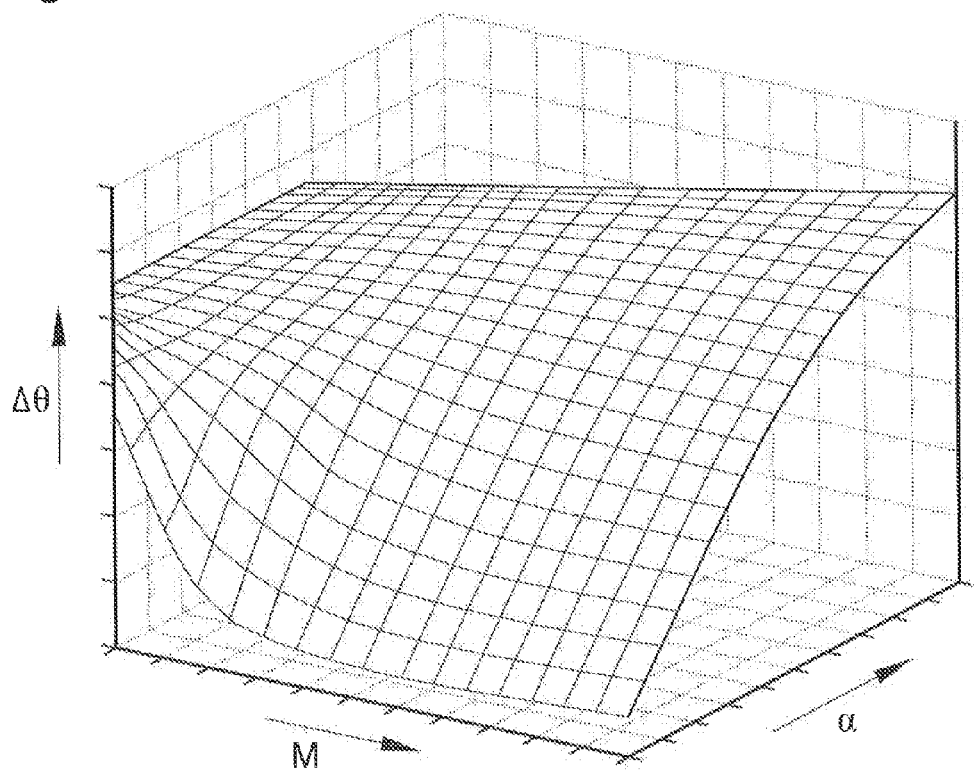
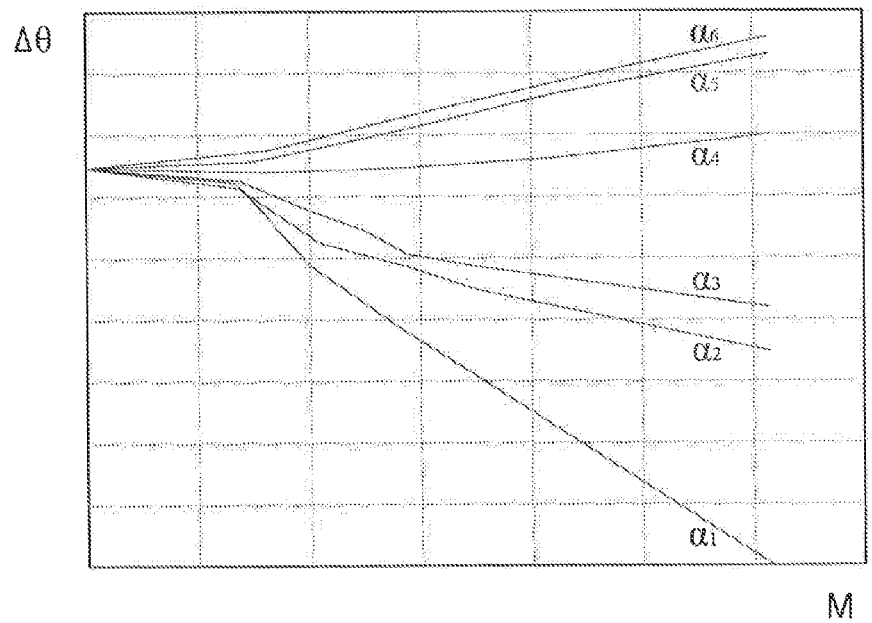
Fig. 3

METHOD FOR ESTIMATING TORQUE DOWNSTREAM OF A VEHICLE TRANSMISSION

CROSS REFERENCE TO RELATED APPLICATIONS

This application is the U.S. national stage entry of International Application Number PCT/EP2013/075008 filed under the Patent Cooperation Treaty having a filing date of Nov. 28, 2013 and is based upon and claims priority to Italian Application Number MO2012A000298 having a filing date of Nov. 29, 2012, the disclosures of both of which are hereby incorporated by reference herein in their entirety for all purposes.

FIELD OF THE INVENTION

The invention relates to a method for estimating torque downstream of a transmission of a vehicle, particularly a working vehicle such as a tractor, an excavator or the like.

BACKGROUND OF THE INVENTION

Tractors are known which comprise a transmission system including a continuously variable transmission (CVT) for transmitting a torque from an internal combustion engine to a driving axle and hence to the wheels. Known continuously variable transmissions may comprise a hydrostatic transmission including a hydrostatic unit. The latter in turn may comprise a variable displacement hydraulic pump connected to a hydraulic motor. By varying the displacement volume of the hydraulic pump, the wheel speed can be set to the desired value.

In addition to the hydrostatic transmission, the transmission system of known tractors also comprises a planetary gearing interposed between the engine and the wheels.

Different torque paths may be defined for transmitting torque from the engine to a location downstream of the transmission system, depending on the gear ratio selected by the driver. These torque paths may either pass through the hydrostatic transmission or not, or they may involve different gears in the planetary gearing.

A power take-off may be provided downstream of the transmission system. One or more implements can be connected, if desired, to the power take-off and receive power from the engine through the transmission system.

Known tractors may comprise a power boost device for requesting additional power from the engine when an implement is connected to the power take-off, in order to ensure that enough power is nevertheless available to the wheels. The power boost device is activated when torque at the power take-off exceeds an on-threshold value and is deactivated when torque at the power take-off drops below an off-threshold value.

In order to activate and deactivate the power boost device at the proper moment, it is therefore important to estimate the current value of the torque at the power take-off.

To this end, calculation methods have been provided which try to estimate the torque at the power take off on the basis of two parameters, i.e. a torque value measured upstream of the transmission system and a twist value measured between two points of a driveshaft of the transmission system. The twist value is an angle which is indicative of the phase difference between the rotational speed downstream and upstream of the transmission system.

The known calculation methods have the drawback that they are quite inaccurate, particularly at certain working points.

SUMMARY OF THE INVENTION

An object of the invention is to improve methods for estimating torque downstream of a transmission system of a vehicle, particularly at a power take-off of a working vehicle such as a tractor.

A further object is to provide a method for estimating torque downstream of a transmission system of a vehicle, which has a good accuracy at a plurality of working points.

Another object is to provide a method for estimating torque downstream of a transmission system which has a sustainable computational cost.

A further object is to provide a method for estimating torque downstream of a transmission system of a vehicle, using data coming from sensors that are already present on the vehicle for other purposes.

Another object is to ensure that a power boost device of a vehicle is correctly activated in case of need and deactivated when its use is no more necessary.

According to the invention, there is provided a method for estimating torque transmitted to a structure located downstream of a transmission system of a vehicle, the vehicle comprising an engine for generating torque, the transmission system being configured to transmit a fraction of the torque generated by the engine to a plurality of wheels of the vehicle and a further fraction of the torque generated by the engine to said structure, the transmission system comprising:
  a shaft arrangement interposed between the engine and said structure;
  a planetary gearing supported by the shaft arrangement;
  a transmission unit arranged in parallel to the shaft arrangement;
characterized in that the torque transmitted to said structure is estimated on the basis of a group of parameters comprising:
  torque upstream of the transmission system;
  twist of the shaft arrangement;
  a parameter which is indicative of the ratio between an output rotational speed at an output of the transmission unit and an input rotational speed at an input of the transmission unit.

Owing to the invention, it is possible to estimate torque transmitted to a structure located downstream of the transmission system with great precision.

In particular, by taking into account the parameter which is indicative of the ratio between the output rotational speed and the input rotational speed of the transmission unit, it is possible to achieve a greater accuracy than in known methods, which were based only on torque and twist.

The parameter which is indicative of the ratio between the output rotational speed and the input rotational speed of the transmission unit is normally known.

The torque at the input of the transmission system and the twist of the shaft arrangement can normally be measured by means of detector elements that are present on the vehicle for other purposes. Thus, the method according to the invention can be carried out without providing additional detector elements on the vehicle.

The structure located downstream of the transmission system at which torque is estimated can be, for example, a power take-off connectable to one or more implements and arranged for powering the implements. In this case, the method according to the invention can be used to determine whether a power boost device should be activated in order to obtain additional power from the engine.

The structure located downstream of the transmission system at which torque is estimated can also be different from the power take-off and can comprise, for example, one or more auxiliary pumps for providing hydraulic power to one or more auxiliary devices. In this case, the method according to the invention can be used to determine torque transmitted to the auxiliary pumps for several purposes.

BRIEF DESCRIPTION OF THE DRAWINGS

The invention will be better understood with reference to the attached drawings, which show some exemplifying and non-limitative embodiments thereof, in which:

FIG. 2 illustrates a three-dimensional surface showing how a given torque at a power take-off of the vehicle can be associated to a determined combination of several parameters;

FIG. 3 is a graph showing schematically how twist of a shaft arrangement of the transmission system varies as a function of torque upstream of the transmission system, in conditions of constant transmission ratio and constant torque at the power take-off;

FIG. 1 shows schematically a transmission system 1 of a vehicle, particularly a working vehicle such as a 20 tractor or an excavator.

DETAILED DESCRIPTION OF THE INVENTION

The vehicle comprises an internal combustion engine 2, particularly a diesel engine, for rotatably driving an engine shaft 4. The engine shaft 4 can be a crankshaft of the engine 2.

Figure 1:
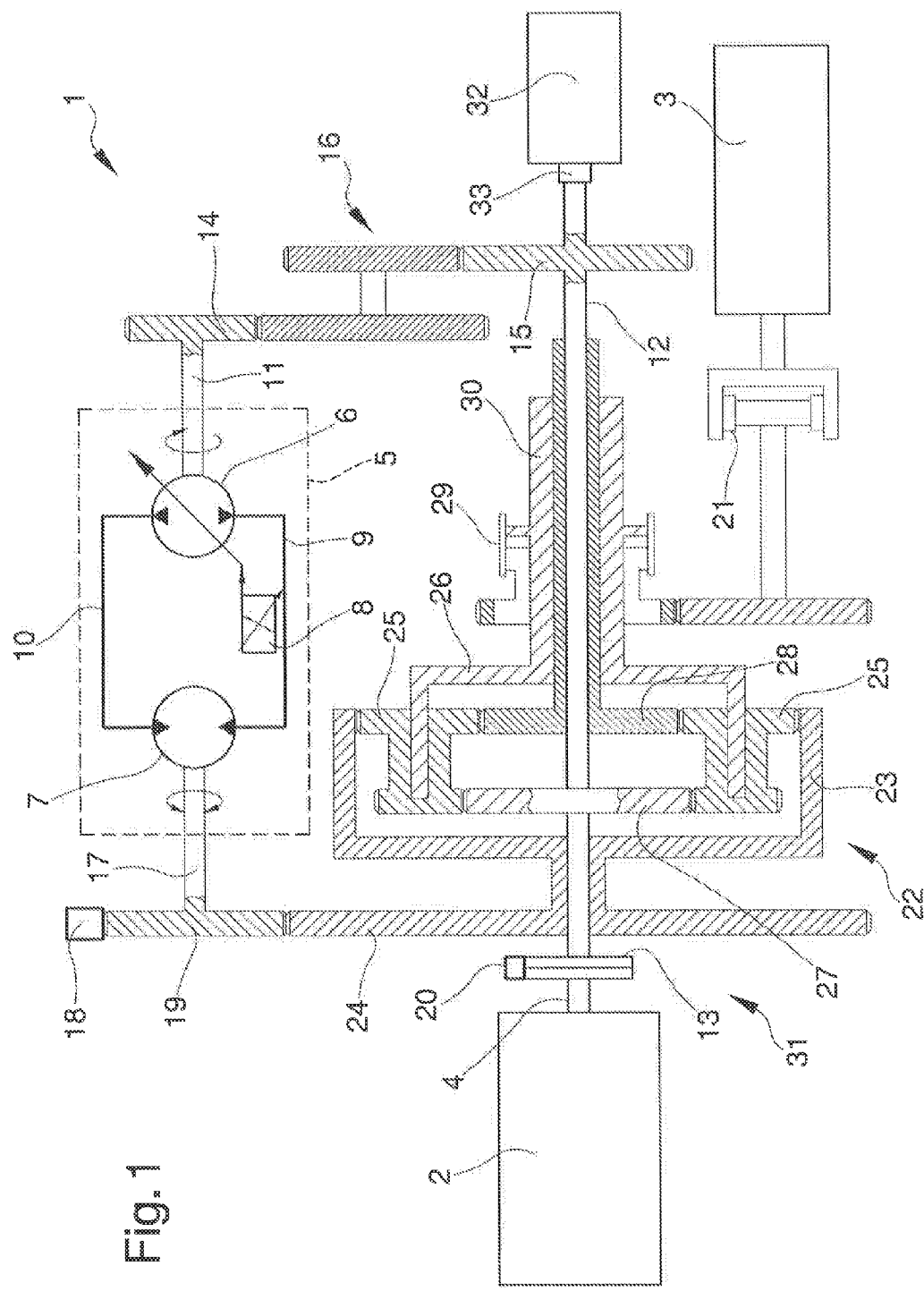
FIG. 1 is a schematic drawing of a transmission system of a vehicle.

The transmission system 1 comprises a continuously variable transmission (CVT) interposed between the engine 2 and a plurality of wheels 3 of the vehicle, shown only schematically in FIG. 1. The continuously variable transmission comprises a hydrostatic transmission including a hydrostatic unit 5, whose outline has been shown schematically by a dashed line in FIG. 1. The hydrostatic unit 5 in turn comprises a hydraulic pump 6 and a hydraulic motor 7 so configured as to be driven by the hydraulic pump 6.

The hydraulic pump 6 has an input shaft 11, whereas the hydraulic motor 7 has an output shaft 17. The hydraulic pump 6 can be a variable displacement pump. In particular, the hydraulic pump 6 can be an axial pump and can comprise a swash plate cooperating with a plurality of axial pistons.

An adjusting device 8 is provided for adjusting the position of the swash plate, i.e. for adjusting the swivel angle of the swash plate and consequently the displacement volume of the hydraulic pump 6. The adjusting device 8 can comprise, for example, an electro-valve.

By varying the position of the swash plate of the hydraulic pump 6. It is possible to change the ratio between the output speed and the input speed of the hydrostatic unit 5, which can be expressed by means of a suitable parameter. In particular, a parameter $\alpha$ can be defined which is indicative of the ratio between the rotational speed of the output shaft 17 and the rotational speed of the input shaft 11.

In an embodiment which is not shown, the hydraulic pump 6 can be a variable displacement pump and the hydraulic motor 7 can be a variable displacement motor. In this situation, the parameter $\alpha$ takes into account both the selected swivel angle of the hydraulic pump 6 and the selected swivel angle of the hydraulic motor 7.

The hydraulic pump 6 and the hydraulic motor 7 are connected to one another by means of a first line 9 and a second line 10. A hydraulic fluid can be sent from the hydraulic pump 6 to the hydraulic motor 7 through the first line 9. In this case, the hydraulic fluid comes back from the hydraulic motor 7 to the hydraulic pump 6 through the second line 10. The first line 9 is therefore a high-pressure line, whereas the second line 10 is a low-pressure line, because the pressure of the hydraulic fluid in the first line 9 is higher than the 10 pressure of the hydraulic fluid in the second line 10.

If however the rotation direction of a shaft of the hydraulic pump 6 is inverted, while all the other working conditions remain unchanged, the hydraulic fluid can also be sent from the hydraulic pump 6 to the hydraulic motor 7 through the second line 10, and come back to the hydraulic pump 6 through the first line 9. The first line 9 is in this case a low-pressure line, whereas the second line 10 is a high-pressure line.

A damping assembly 31 is provided for connecting the engine shaft 4 to a transmission shaft 12 of the transmission system 1. The engine shaft 4 acts as a driving shaft since it rotatingly drives the transmission shaft 12 through the damping assembly 31.

The damping assembly 31 serves for deflecting and thus absorbing the power pulses generated by the engine 2, so that torque delivered to the transmission shaft 12 is more constant over an engine cycle.

The damping assembly 31 may comprise a first rotatable element connected to the engine shaft 4 and a second rotatable element connected to the transmission shaft 12. The second rotatable element can be a damper 13, for example comprising a plurality of resilient elements acting in a circumferential direction to exert a damping action.

The first rotatable element could be, for example, a flywheel.

More detailed information concerning the structure of the damper 13 can be found in EP 0741286, which relates to a mechanical damper. In the alternative, other kinds of damper could be used, for example a viscous damper.

The input shaft 11 of the hydraulic pump 6 is mechanically connected to the engine 2, so that the input shaft 11 can be rotatingly driven by the engine 2. The input shaft 11 can be connected to the engine 2 via a mechanical connection comprising, for example, a toothed wheel 14 fixed relative to the input shaft 11.

The toothed wheel 14 engages with a further toothed wheel 15 which is fixed relative to the transmission shaft 12.

An intermediate gear 16 can be interposed between the toothed wheel 14 and the further toothed 20 wheel 15.

The output shaft 17 of the hydraulic motor 7 is suitable for being rotated when the hydraulic fluid is sent into the hydraulic motor 7.

A sensor 18 is provided for measuring the speed of the output shaft 17, particularly the rotational speed thereof. The sensor 18 can be associated to a cogwheel 19 fixed relative to the output shaft 17, so that the sensor 18 is adapted to measure the rotational speed of the cogwheel 19 and hence of the output shaft 17.

A detector 20 may be provided for detecting one or more working parameters upstream of the transmission system 1, particularly at the damper 13. The detector 20 can be configured for detecting torque transmitted to the transmission shaft 12 by the damper 13, i.e. torque M upstream of the transmission system 1.

A clutch 21 allows the wheels 3 to be selectively connected to, or disconnected from, the engine 2. A mechanical transmission device is interposed between the engine 2 and the clutch 21. In the embodiment shown in FIG. 1, the mechanical transmission device comprises a planetary gearing 22.

The hydrostatic unit 5 is arranged in parallel to the transmission shaft 12 supporting the planetary gearing 22.

The planetary gearing 22 comprises an annulus or outer ring 23 capable of being rotated by the output shaft 17 of the hydrostatic transmission. To this end, the outer ring 23 may be fixed relative to an intermediate toothed wheel 24 arranged to engage with the cogwheel 19. 20

The planetary gearing 22 further comprises a plurality of planet gears 25 supported by a planet carrier 26.

The planetary gearing 22 further comprises a sun gear 27 which can be fixed relative to the transmission shaft 12. A further sun gear 28 is also provided, which can engage with the planet gears.

Power can be transmitted to the wheels 3 alternatively via the planet carrier 26 or via the further sun gear 28, in which case the planet carrier 26 is left free to rotate.

A synchronizing device 29 is interposed between the planetary gearing 22 and the clutch 21 for allowing a smooth engagement of the gears of the transmission system 1.

More than one synchronizing device can be present, although they have not been shown since they are not relevant for performing the method that will be disclosed below. For example, a further synchronizing device that is not shown can be associated to a tubular element 30 fixed relative to the further sun gear 28.

Torque generated by the engine 2 is split into two torque fractions which reach the planet gears 25 through two different input torque paths. A first input torque path goes from the engine 2 to the transmission shaft 12 via the engine shaft 4, then to the hydrostatic unit 5 through the toothed wheels 14, 15 and finally to the outer ring 23 of the planetary gearing 22 through the cogwheel 19 and the intermediate toothed wheel 24. A second input torque path goes from the engine shaft 4 to the planet carrier 26 through the transmission shaft 12 20 and the sun gear 27. The two input torque paths join to one another at the planet gears 25.

Torque exits from the planetary gear through two alternative output torque paths. The first output torque path passes through the planet carrier 26, the tubular element 30 and the synchronizing device 29. The second output torque path goes from the further sun gear 28 to the further synchronizing device that is not shown.

In an alternative embodiment, different configurations of torque paths can be provided for transmitting torque through the planetary gearing 22.

A power take-off 32, schematically shown in FIG. 1, may be provided downstream of the transmission system. One or more implements may be connected to the power take-off 32 so as to be driven by the engine 2 by receiving power through the transmission system.

A detecting element 33 may be provided for detecting twist $\Delta\theta$ of the transmission shaft 12. Twist $\Delta\theta$ is indicative of the torsion angle of the transmission shaft 12 due to the torque applied by the engine 2.

Twist $\Delta\theta$ is calculated by combining a signal coming from the detector 20 with a further signal coming from the detecting element 33.

The vehicle may comprise one or more auxiliary pumps arranged for providing hydraulic power to a plurality of auxiliary devices such as, for example, a lift or one or more distributors. The auxiliary pumps are connected to the transmission shaft 12 so as to be driven by the latter.

The vehicle may comprise a power boost device for requesting additional power from the engine 2 when torque is transmitted downstream of the power take-off 32 in order to drive any implement coupled to the power take-off 32. The power boost device is activated when torque T at the power take-off 32 overcomes a predefined on-threshold value and is deactivated when torque at the power take-off 32 falls below a predefined off-threshold value.

The on-threshold value may be different from the off-threshold value. For example, the on-threshold value may be greater than the off-threshold value.

In order that the power boost device may be correctly activated and deactivated, it is therefore important to determine the value of torque T transmitted to the power take-off 32.

The following relationship can be defined between torque upstream and downstream of the transmission system:

$$M = T + W + H$$

wherein M is torque upstream of the transmission shaft 1. In particular, M indicates the torque generated by the engine 2 and transmitted to the transmission shaft 12, for example as measured by the detector 20 at the damper 13. T is torque transmitted to the power take-off 32. W is indicative of the torque transmitted to the wheels 3. H is the torque transmitted to the auxiliary pumps, if any. From a practical point of view, if the power take-off 32 is active, the contribution given by the auxiliary pumps can be substantially neglected.

Although the detector 20 and the detecting element 33 allow the twist $\Delta\theta$ of the transmission shaft 3 to be measured, this measurement does not give any indication 20 concerning which fraction of the twist $\Delta\theta$ is caused by torque transmitted to the wheels 3, which fraction of the twist $\Delta\theta$ is caused by torque transmitted to the power take-off 32, and which fraction of the twist $\Delta\theta$ is caused by torque transmitted to the auxiliary pumps, if any.

For this reason, from the twist $\Delta\theta$ alone it is not possible to derive the torque T applied to the power take-off 32 by the transmission system 1.

Tests have shown that the torque T downstream of the transmission system, at the power take-off 32, is a function of three parameters, namely:

torque M generated by the engine 2 upstream of the transmission system 1, particularly as measured by the detector 20 at the damper 13;

twist $\Delta\theta$ of the transmission shaft 12, particularly as measured by the detector 20 at the damper 13 and the detecting element 33 at the power take-off 32;

ratio between the output speed and the input speed of the hydrostatic unit 5, expressed for example by means of the parameter $\alpha$.

This has been confirmed by mathematical calculations, which have shown that, in a three-dimensional space defined by three axes, namely the torque M upstream of the transmission system 1, the twist $\Delta\theta$ and the parameter $\alpha$, all the points having the same value of the torque T at the power take-off 32 lie on a three dimensional surface, for example a curved surface. This surface is shown in FIG. 2. In other words, as shown in FIG. 3, for a given torque T at the power take-off 32, the twist $\Delta\theta$ varies as a function of torque M upstream of the transmission system 1 according to a curve which is different for different values of the parameter $\alpha$.

Figure 4:
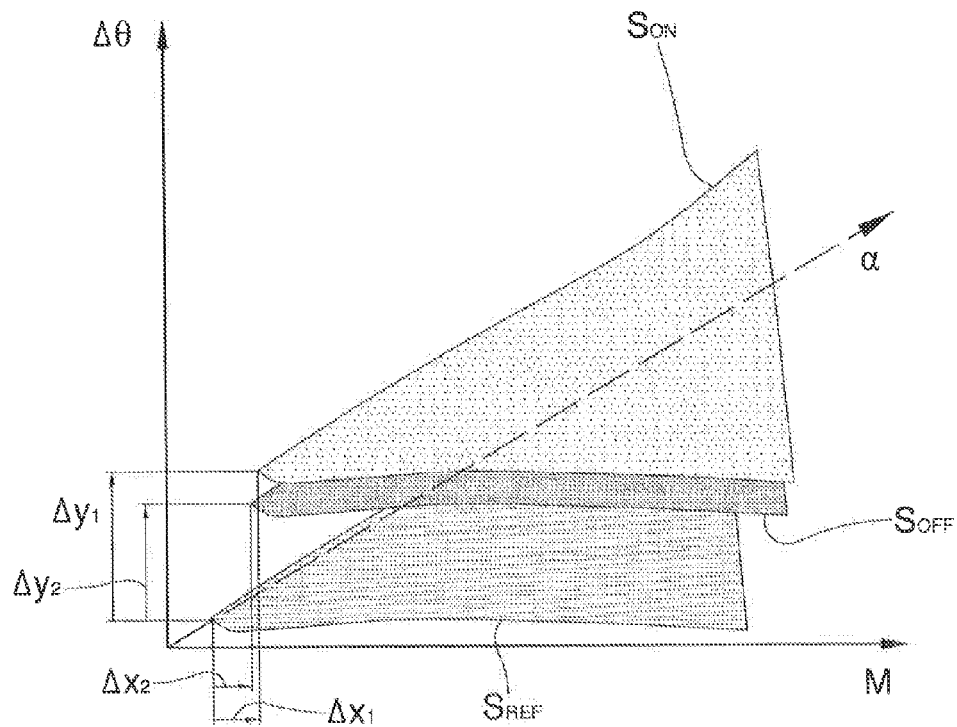
FIG. 4 is a graph like FIG. 2, showing a reference 5 surface and two threshold surfaces.

Thus, it is possible to define, in a three-dimensional space where twist $\Delta\theta$ is plotted against torque M upstream of the transmission system 1 and against the parameter $\alpha$, a first surface $S_{ON}$ showing how the twist $\Delta\theta$ varies as a function of the torque M and the parameter $\alpha$ for a given value of the torque T at the power take-off 32, particularly for a value of the torque T equal to the on-threshold value, i.e. the value at which the power boost device is activated. In the same three dimensional space, it is possible to define a second surface $S_{OFF}$ plotting the twist $\Delta\theta$ against the torque M and the parameter $\alpha$ for a value of the torque T at the power take-off 32 equal to the off-threshold value, i.e. the value at which the power boost device is deactivated. Finally, a reference surface $S_{REF}$ can be defined, joining the points corresponding to a reference value of the torque T at the power take-off 32. For example, the reference value could be zero. The surfaces $S_{ON}$, $S_{OFF}$ and $S_{REF}$ are shown in FIG. 4.

It has been shown that, if the power take-off 32 and the auxiliary pumps are not working, so that substantially all the torque generated by the engine 2 is transmitted to the wheels 3, a non-linear relationship exists between the torque M upstream of the transmission system 1, the twist $\Delta\theta$ and the parameter $\alpha$. Basically, the hydrostatic unit 5 is responsible for this relationship being non-linear. If the power take-off 32 is now activated, while the auxiliary pumps are still not working, the above mentioned non-linear relationship continues to be valid and is simply linearly shifted in the three-dimensional space M-$\alpha$-$\Delta\theta$. The power take-off 32 is responsible for this linear shift.

Therefore, the surfaces $S_{ON}$, $S_{OFF}$ and $S_{REF}$ have the same shape. This shape is influenced by the torque path through which torque is transmitted from the engine 2 to the wheels 3. In particular, the surfaces $S_{ON}$, $S_{OFF}$ and $S_{REF}$ have a predetermined shape if torque reaches the wheels 3 through the planet carrier 26, and a different shape if toque reaches the wheels 3 through the further sun gear 28.

The first surface $S_{ON}$ is obtained by shifting the reference surface $S_{REF}$ by a torque offset $\Delta x1$ along the axis of torque M and by a twist offset $\Delta y1$ along the axis of twist $\Delta\theta$. Similarly, the second surface $S_{OFF}$ is obtained by shifting the reference surface $S_{REF}$ by a torque offset $\Delta x2$ along the axis of torque M and by a twist offset $\Delta y2$ along the axis of twist $\Delta\theta$. The twist offsets $\Delta y1$, $\Delta y2$ and the torque offsets $\Delta x1$, $\Delta x2$ can be determined by tests.

Figure 5:
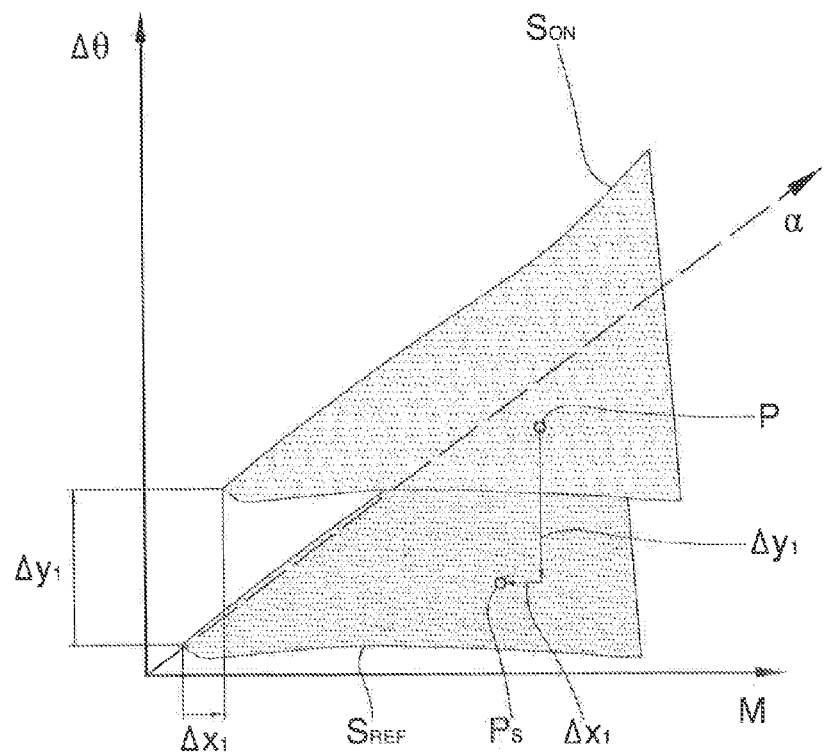
FIG. 5 is a graph like FIG. 4, in which only one threshold surface is shown.

The working conditions of a vehicle can be represented by a working point P in the three-dimensional space M-$\alpha$-$\Delta\theta$, as shown in FIG. 5. The coordinates of the working point P are the torque MP upstream of the transmission system 1, as measured by the detector 20, the twist $\Delta\theta_P$ of the transmission shaft 12, as measured from signals coming from the detector 20 and the detecting element 33, and the parameter $\alpha P$, which is also known. By showing the working point P in the three dimensional space M-$\alpha$-$\Delta\theta$, in addition to the surfaces SON, $S_{OFF}$ and $S_{REF}$, it is possible to evaluate whether the working point P is located above or below the first surface $S_{ON}$ and the second surface $S_{OFF}$ and consequently determine what should be the status of the power boost device.

However, this procedure is quite complicated from a computational point of view, since it requires that the position of all the points obtained by offsetting the points of the reference surface $S_{REF}$ be calculated in order to draw the first surface $S_{ON}$ and the second surface $S_{OFF}$. A so complicated procedure could not run on a control unit of a vehicle.

It has therefore been proposed to offset only the working point P, instead of offsetting the whole surfaces $S_{ON}$ and $S_{OFF}$.

For example, if it is desired to know whether, for the working point P, the torque $T_P$ at the power take-off 32 is above or below the on-threshold value, it is possible to proceed as follows.

First of all, a shifted torque $M_S$ of the working point P upstream of the transmission system is calculated, by subtracting the torque offset $\Delta x1$ of the first surface $S_{ON}$ from the measured value of the torque $M_P$.

Similarly, a shifted twist $\Delta\theta_S$ of the working point P downstream of the transmission system is calculated, by subtracting the twist offset $\Delta y1$ of the first surface $S_{ON}$ from the measured value of the twist $\Delta\theta_P$.

The parameter $\Delta_P$ of the working point P is left as it is.

In other words, a shifted working point $P_S$ is defined having the following coordinates:

$$M_S = M_P - \Delta x1$$

$$\Delta\theta_S = \Delta\theta_P - \Delta y1$$

$$\alpha_S = \alpha_P$$

Determining whether the working point P is above the on threshold value (i.e. the first surface $S_{ON}$), is equivalent to determining whether the shifted working point $P_S$ is above the reference surface $S_{REF}$, i.e. whether the shifted twist $\Delta\theta_S$ is greater than $\Delta\theta_{REF}$, wherein $\Delta\theta_{REF}$ is the value of the twist $\Delta\theta$ calculated on the reference surface $S_{REF}$ for a value of the torque upstream of the transmission system equal to $M_S$.

From a practical point of view, this can be done as follows. A table has been prepared and stored in a control unit of the vehicle, the table having three columns, namely the torque MS of the shifted working point upstream of the transmission system 1, the parameter $\alpha_P$ of the working point and the reference value of the twist $\Delta\theta_{REF}$ which ensures that—for the considered values of $M_S$ and $\alpha_P$—the torque T at the power take-off 32 is equal to a predetermined reference value, e.g. equal to zero.

The table has a number of rows, each row corresponding to a particular working point P and hence to a particular shifted working point $P_S$. The table thus derives from a discrete mapping of the surface $S_{REF}$.

The torque $M_S$ of the shifted working point upstream of the transmission system 1 and the parameter $\alpha_P$ of the working point are used as input elements for the above mentioned table. If the exact values of $M_S$ and $\alpha_P$ are not present in the rows of the table, linear or non-linear interpolation may be used to interpolate between the values appearing in the table. On the basis of these two input elements, the table gives as an output the reference value of the twist $\Delta\theta_{REF}$ which ensures that the torque T downstream of the transmission system is equal to the predetermined reference value, e.g. equal to zero.

Instead of using the table deriving from a discrete mapping of the surface $S_{REF}$, it is possible to use directly the mathematical equation of the surface $S_{REF}$ in order to calculate the reference value of the twist $\Delta\theta_{REF}$. This mathematical equation might be, for example, a $4^{th}$ or $5^{th}$ order equation.

After obtaining the reference value of the twist $\Delta\theta_{REF}$, the reference value can be compared to the twist $\Delta\theta_S$ of the shifted working point in order to determine whether the twist $\Delta\theta_S$ of the shifted working point is greater than, or lower than, the reference value of the twist $\Delta\theta_{REF}$.

If it is found that the twist $\Delta\theta_S$ of the shifted working point is greater than the reference value of the twist $\Delta\theta_{REF}$, than the working point P is above the first surface $S_{ON}$, i.e. the torque T at the power take-off 32 in the working point P is greater than the on-threshold value. The power boost device should therefore be activated, because power is being transmitted to something connected to the power take-off.

This corresponds to the example shown in FIG. 5. On the other hand, if it is found that the twist $\Delta\theta_S$ of the shifted working point is lower than the reference value of the twist $\Delta\theta_{REF}$, than the working point P is below the first surface $S_{ON}$, i.e. the torque T at the power take-off 32 in the working point P is lower than the on-threshold value. In this case, if the power boost device is in a deactivated status, it should be left in this condition.

A similar approach can be used to determine whether or not the working point P is above or below the second surface $S_{OFF}$, i.e. whether or not the torque T at the power take-off 32, in the working point P, is above or below the off-threshold value. In this case, the working point P will be shifted by subtracting from its coordinates respectively the torque offset $\Delta x2$ and the twist offset $\Delta y2$ of the second surface $S_{OFF}$.

It is then possible to give a discrete, i.e. a non-continuous, estimation of the torque T at the power take-off 32, as set out below with reference to FIG. 6.

Figure 6:
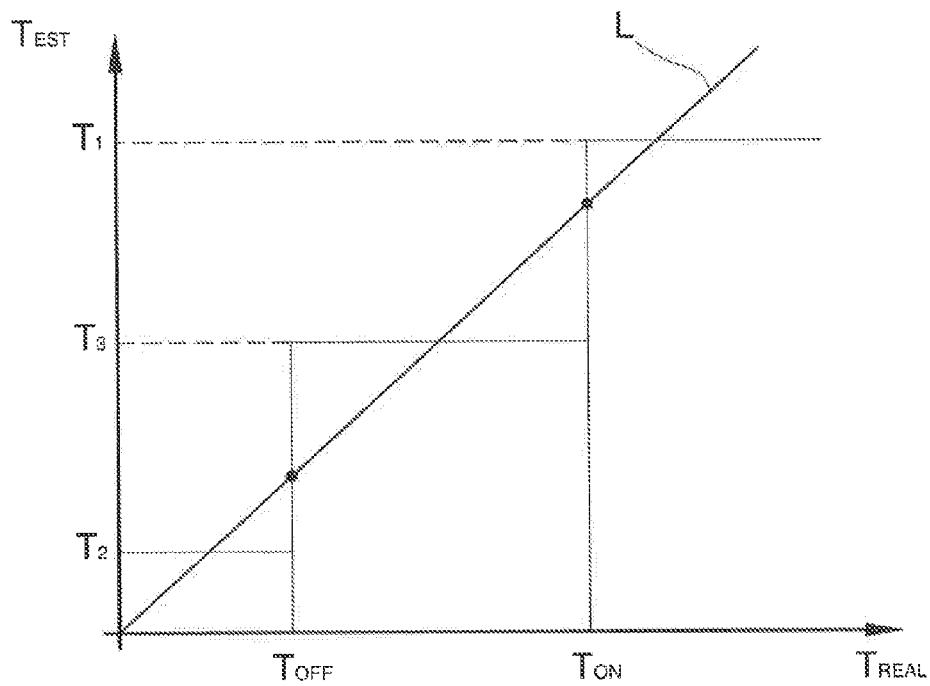
FIG. 6 is a graph showing how torque at the power take-off is estimated by means of a discrete procedure.

FIG. 6 shows on the abscissa axis the real values $T_{REAL}$ of the torque T at the a power take-off 32. The real values $T_{REAL}$ correspond to the actual torque T P at the power take-off 32 for any possible working point P. On the ordinate axis, the estimated values TEST of the torque T at the power take-off are shown. The real on threshold value and off-threshold value of torque T have been indicated as $T_{ON}$ and $T_{OFF}$ respectively. A straight line L has further been drawn in FIG. 6, which is inclined by an angle of 45° relative to the horizontal direction.

If, by means of the procedure disclosed above with reference to FIG. 6, it is found that, in the working point P, the torque at the power take-off 32 is greater than the on-threshold value, then the estimated torque at the power take-off 32 is given the estimated value T1, with T1>$T_{ON}$. In other words, when the torque at the power take-off 32 is greater than the on-threshold value, the estimated torque at the power take-off 32 is always given the constant value T1>$T_{ON}$.

If it is found that the torque at the power take-off 32 is lower than the off-threshold value, the estimated torque at the power take-off 32 is given the constant value T2, with T2<$T_{OFF}$.

Finally, if it is found that the torque at the power take-off 32 is greater than the off-threshold value, but lower than the on-threshold value, the estimated torque at the power take-off 32 is given the constant value T3, with:

$T_{OFF}$<T3<$T_{ON}$.

When the estimated value of the torque at the power take-off 32 has been determined, the estimated value is transmitted to the control unit of the vehicle, so that the control unit can decide whether the power boost device should be activated or not. In particular, if the estimated value of torque at the power take-off 32 is T1, then the control unit ensures that the power boost device is in an activated status. If the estimated value of the torque at the power take-off 32 is T2, then the control unit ensures that the power boost device is in a deactivated status. If the estimated value of the torque at the power take-off 32 is T3, the control unit leaves the power boost device in the status in which it was before.

Even if the procedure which has been described above merely gives three discrete values of the estimated torque downstream at the power take-off 32, and hence does not allow the effective value of the torque to be exactly determined, it is however sufficiently precise to reach the intended purpose, namely allowing the power boost device to be activated when actually needed and to be deactivated if not needed.

Furthermore, the above procedure is not excessively complicated from a computational point of view and may be successfully carried out even by control units of the kind which is normally used on vehicles.

It is sufficient to store in the control unit the table which gives as an output the reference value of the twist $\Delta\theta_{REF}$, when the torque $M_S$ of the shifted working point upstream of the transmission system and the parameter $\alpha_P$ of the working point are entered in the table as input elements.

The coordinates of the shifted working point $P_S$ are then calculated by means of two simple subtractions. The only other mathematical calculation required is a comparison operation between the reference value of the twist $\Delta\theta_{REF}$. Depending on the result of this comparison, either T1, T2 or T3 is chosen as the estimated torque at the power take-off 32.

Finally, the above procedure can be carried out by means of data acquired from detecting elements which are already present on the vehicle for other purposes. The detector 20 and the detecting element 33 are normally present on vehicles of the kind disclosed, so that there is no need to install specific sensors.

In some cases, there might be the need to estimate continuously how the torque T at the power take-off 32 varies. Certain applications require a continuous signal indicative of how torque T at the power take-off 32 varies. In these cases, the procedure disclosed above, which gives only three discrete values so of the estimated torque at the power take-off 32 is not sufficient, and a different procedure has to be adopted.

A method according to a different embodiment will now be disclosed. In this case, it is possible to use partially the procedure disclosed above to obtain a continuous estimation of the torque at the power take-off 32. To this end, the difference DΔθ between the twist $\Delta\theta_S$ of the shifted working point and the reference value of the twist $\Delta\theta_{REF}$ is calculated. This difference is then divided by a coefficient which is indicative of the elasticity of the transmission system 1, thereby obtaining an estimation of the torque T at the power take-off 32. Indeed, the torque downstream of the transmission system 1 depends on the twist Δθ divided by the elasticity coefficient of the transmission system 1.

This is easy to be understood because, if the transmission shaft 12 is more elastic, a greater twist Δθ will be associated to a pre-established torque downstream of the transmission system 1.

The elasticity coefficient of the transmission system 1 can be calculated once the geometry of the transmission system 1 and the properties of the materials making up the transmission shaft 12 are known. As an alternative, the elasticity coefficient can also be determined on the basis of experimental results.

Figure 7:
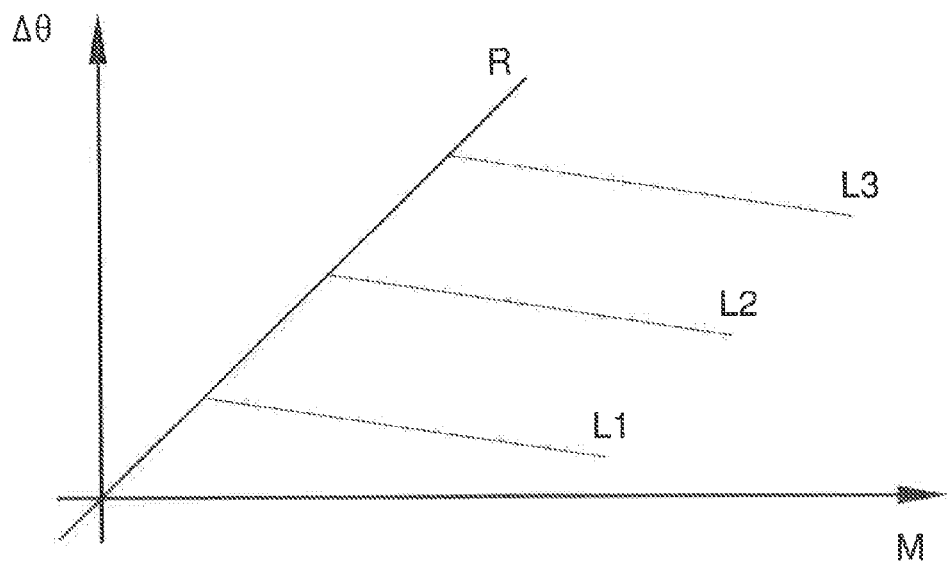
FIG. 7 is a graph showing how twist of the shaft arrangement varies as a function of torque upstream of the transmission system, for different values of torque at the power take-off.

A different and more precise procedure to determine how torque T at the power take-off 32 varies will be disclosed below with reference to FIGS. 7 to 9. As already explained, for a given value of the parameter α, the points having a preselected value of the torque T at the power take-off 32 can be represented by a line in a two-dimensional space in which twist Δθ of the transmission shaft 12 is plotted against torque M upstream of the transmission system 1. FIG. 7 relates to an example in which three lines L1, L2, L3 (corresponding respectively to a torque T at the power take-off 32 of 0 Nm, 100 Nm and 200 Nm), have been shown in the two-dimensional space M-Δθ, for a given value of the parameter α. For the sake of simplicity, the lines L1, L2, L3 have been shown as straight lines, although they could also be curves.

As shown in FIG. 7, the lines L2, L3 are obtained by shifting the line L1 along a straight line R. In other words, the offset between different lines 3o joining the points with a constant value of torque T at the power take-off 32 varies linearly from one line to another.

The straight line R can thus be called an offset line, since its points correspond to the offset between different torque lines L1, L2, L3 and so on.

Figure 8:
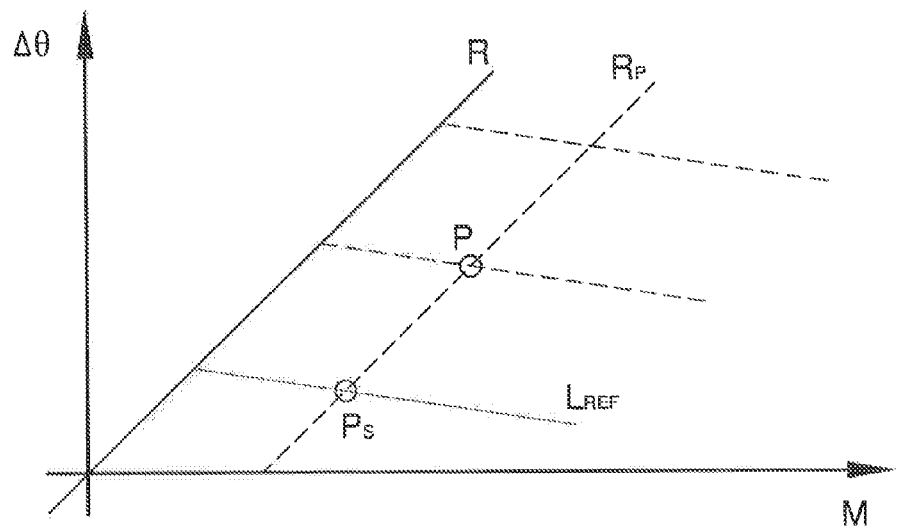
FIG. 8 is a graph like FIG. 7, showing a working point corresponding to certain working conditions.
Figure 9:
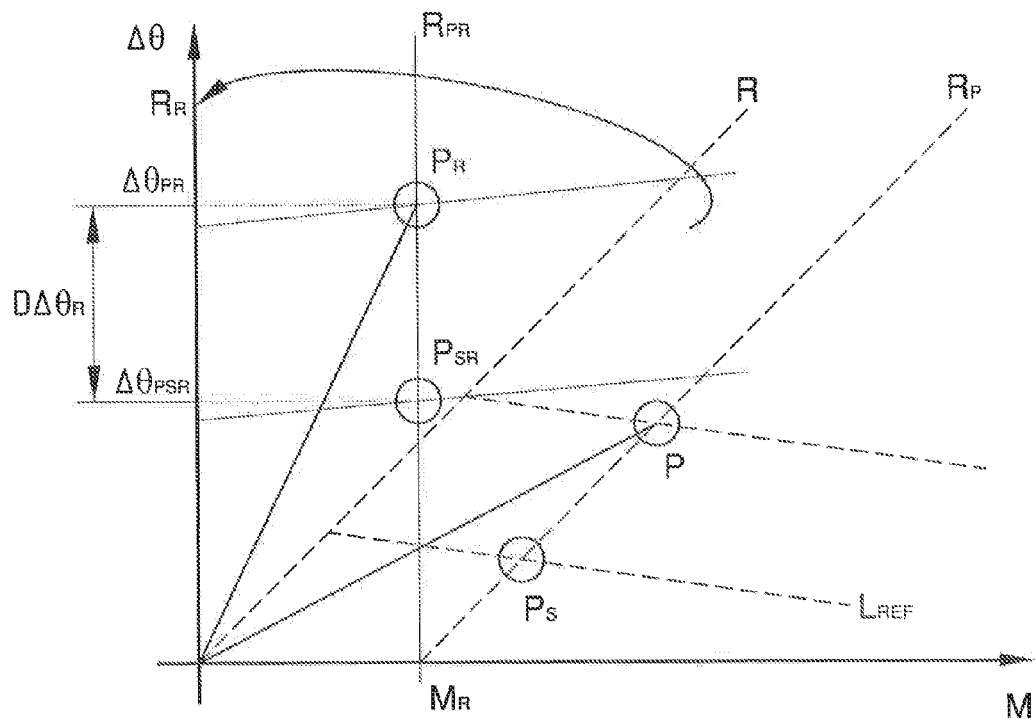
FIG. 9 shows the graph of FIG. 8, in a rotated configuration.

FIG. 8 shows, in the two-dimensional space M-Δθ, a reference line $L_{REF}$ which joins all the points that, for a given value of the parameter α, have a torque T at the a power take-off 32 which is equal to a preselected reference value, for example zero. The reference line $L_{REF}$ has been represented as a straight line in FIG. 8, although it might also have a different conformation.

The offset line R is also illustrated, representing the variation of the offset between different lines joining points having constant values of torque T at the power take-off 32. The line R, which is a straight line, can be drawn on the basis of test results. In particular, the offset line R shows how, for a given value of the parameter α, the twist Δθ varies as a function of the torque T at the power take-off 32 when no torque is applied to the wheels.

A working point P is also shown, corresponding to certain working conditions of the vehicle, particularly twist $Δθ_P$ downstream of the transmission system and torque $M_P$ of the transmission shaft 12. In order to determine the torque at the power take-off 32 in the working conditions corresponding to the working point P, the working point P could be shifted on the reference line $L_{REF}$. In particular, it would be possible to proceed as follows:
  determining a straight line $R_P$ parallel to the line R and passing through the working point P;
  determining the point of intersection $P_S$ (or shifted working point) between the straight line $R_P$ and the reference line $L_{REF}$;
  calculating the coordinates of the point of intersection $P_S$;
  calculating the distance between the working point P and the point of intersection PS (or shifted working point). From this distance, the torque T at the power take-off 32 for the working point P can be determined.

The four steps mentioned above can be carried out in a simplified manner as set out below with reference to FIG. 9.

First of all, the plane M-Δθ is rotated in such a way that the offset line R coincides with the vertical or ordinate axis. In other words, by rotating the offset line R, a rotated offset line RR is obtained, which coincides with the vertical axis.

The line RP passing through the working point P, which is parallel to the offset line R, is thus transformed into a rotated line RPR parallel to the vertical axis.

The working point P and the shifted working point PS are transformed into a rotated working point PR and a rotated shifted working point PSR. Since both the working point P and the shifted working point PS were on the same straight line RP, the rotated working point PR and a rotated shifted working point PSR will have the same abscissa MR.

Since the reference line LREF joins the points having a torque T equal to zero, the difference $DΔθ_R$ between the ordinates $Δθ_{PR}$ of the rotated working point PR and $Δθ_{PSR}$ of the rotated shifted working point $P_{SR}$ is proportional to the torque T at the power take-off 32, for the working conditions corresponding to the working point P. In order to obtain the value of the torque TP at the power take-off 32 for the working conditions corresponding to the working point P, it is sufficient to divide the difference $DΔθ_R$ by the elasticity coefficient, which—as discussed above—is indicative of elasticity of the transmission system 1.

This procedure enables the torque T at the power takeoff 32 to be precisely calculated. From the measures of the torque M upstream of the transmission system and the twist Δθ downstream of the transmission system, the rotated values MR, $Δθ_R$ and $Δθ_{PSR}$ are calculated. This can be done in a manner which is simple from a mathematical point of view, with a limited number of multiplications and additions or subtractions.

Thereafter, the difference $DΔθ_R=Δθ_R-Δθ_{PSR}$, which is also very simple to be calculated, is indicative of the torque T at the power take-off 32, and needs only to be divided by the elasticity coefficient.

From a practical point of view, this can be done by using a table which is similar to the table disclosed above with reference to the discrete procedure. The table has three columns, namely:
  the torque MR of the rotated shifted working point PSR upstream of the transmission system 1;
  the parameter α of the rotated shifted working point PSR (which is identical to the parameter α of the working point P, since all the points on the plane M-Δθ, either rotated or not, have a constant value of the parameter α);
  the twist $Δθ_{PSR}$ of the rotated shifted working point PSR, which lies on the rotated reference line joining the points having a torque T equal to zero.

The table has a number of rows, each row corresponding to a particular working point P and hence to a particular rotated shifted working point PSR. The table thus derives from a discrete mapping of the surface joining all the points having a value of the rotated torque TR at the power take-off 32 equal to the reference value, e.g. zero.

The torque $M_R$ of the rotated shifted working point PSR upstream of the transmission system 1 and the parameter α of rotated shifted working point PSR are used as input elements for the above mentioned table. If the exact values of $M_R$ and α are not present in the rows of the table, linear or non-linear interpolation may be used to interpolate between the values appearing in the table.

The reference value of the twist $Δθ_{PSR}$ of the rotated shifted working point is taken from the table as an output element. Thereafter, the difference $DΔθ_R$ between the ordinates $Δθ_{PR}$ of the rotated working point PR and $Δθ_{PSR}$ of the rotated shifted working point PSR is calculated. This difference is divided by the elasticity coefficient in order to obtain torque T at the power take-off 32.

Instead of using the table mentioned above, the reference value of the twist $\Delta\theta_{PSR}$ can be calculated by using directly the mathematical equation of the surface joining all the points having a value of the rotated torque $T_R$ at the power take-off 32 equal to the reference value, e.g. zero. This mathematical equation might be, for example, a $4^{th}$ or $5^{th}$ order equation.

In a different embodiment, instead of using the table having three columns which has been described above, the twist $\Delta\theta_{PSR}$ of the rotated shifted working point may be calculated by means of the following equation:

$$\Delta\theta_{PSR} = k(\alpha) \times M_R + k_0$$

wherein:
- $k(\alpha)$ is a coefficient which varies as the parameter $\alpha$ varies and, for a given value of the parameter $\alpha$, gives the relationship between torque at the input of the transmission system 1 and twist of the transmission shaft 12;
- $k_0$ is a constant that can be determined by tests;
- $M_R$ is torque of the rotated shifted working point $P_{SR}$ upstream of the transmission system 1.

The coefficient $k(\alpha)$ can be determined by means of a table having two columns, corresponding respectively to the parameter $\alpha$ and the corresponding coefficient $k(\alpha)$.

The table has a number of rows, corresponding to different values of the parameter $\alpha$. Linear or non linear interpolation can be used to calculate the coefficient $k(\alpha)$ for values of the parameter $\alpha$ which are not present in the table.

After the twist $\Delta\theta_{PSR}$ of the rotated shifted working point has been calculated, it may be processed as disclosed above in order to determine torque T at the power take-off 32.

The embodiment of the method using the relationship involving $k(\alpha)$ has a computational cost which is less than the computational cost of the method previously disclosed, because a less complicated table is used.

Instead of the three-column table based on MR, $\alpha$ and $\Delta\theta_{PSR}$, it is sufficient to use a two-column table based on $\alpha$ and $k(\alpha)$. The latter table can also have a smaller number of rows. Thus, computational resources can be saved, although the method—particularly for certain non linear systems—can be less precise than the ones using the three-column table.

The procedure disclosed above enables the torque T at the power take-off 32 to be continuously estimated by using a limited number of simple mathematical calculations. The estimation is quite precise and relies on data detected by sensors which are normally already present on the vehicle for other purposes.

In an embodiment which is not shown, in place of the hydrostatic unit 5, a different kind of transmission unit could be used, e.g. a mechanical or an electronic gear shift. In the latter cases, the parameter $\alpha$ is not affected by the swivel angle of the swash plate of the hydraulic pump 6, but is nevertheless indicative of the ratio the output rotational speed and the input rotational speed of the transmission unit.

In place of the transmission shaft 12, a more complicated shaft arrangement could be provided, for example comprising different shafts, possibly having different diameters, arranged one after the other along a common axis, or even comprising different shafts connected by a gear unit. The method still works as disclosed before, even if a different elasticity coefficient of the transmission system will have to be used.

The torque M upstream of the transmission system, instead of being measured by the detector 20 located at the damper 13, may be measured in any other point between the engine 2 and the transmission system 1.

The above description has always referred to estimation of the torque T at the power take-off 32. To be more precise, what is actually estimated is the sum of the torque T at the power take-off 32 and of the torque H at the auxiliary pumps, if any. However, when the power take-off 32 is active, the contribution of the auxiliary pumps can practically be considered as negligible. For this reason, it is correct to say that the method disclosed above can allow the torque T at the power take-off 32 to be estimated.

If on the other hand the power take-off 32 is not active, torque H can be sent to the auxiliary pumps. In this case, the method disclosed above can be used to estimate the torque H at the auxiliary pumps, because in the sum T+H the contribution of T is substantially negligible. The same procedure as disclosed above can be followed, but a different elasticity coefficient shall be used. This is due to the fact that elasticity of the components interposed between the engine 2 and the power take-off 32 is different from elasticity of the components interposed between the engine 2 and the auxiliary pumps.

Thus, it can be stated that the method disclosed above serves to estimate torque transmitted to a structure located downstream of the transmission system, wherein the structure can be, for example, either the power take-off 32 or the auxiliary pumps.

Furthermore, the method disclosed above can also be used to estimate torque sent at the wheels 3. To this end, the estimated value of the sum T+H can be subtracted from the torque M upstream of the transmission system 1, as measured by the detector 20 at the damper 13. A torque W is thus obtained, which is indicative of the torque transmitted to the wheels 3. To obtain the exact value of the torque transmitted to the wheels 3, the torque W will be divided by the transmission ratio.

Hence, it can be stated that the disclosed method allows torque to be determined at a selected location downstream of the transmission system, wherein the selected location might be the power take-off 32, or the auxiliary pumps, or the wheels 3.

The invention claimed is:

1. A method for estimating torque transmitted to a structure located downstream of a transmission system of a vehicle, the vehicle comprising an engine for generating torque, the transmission system being configured to transmit a fraction of the torque generated by the engine to a plurality of wheels of the vehicle and a further fraction of the torque generated by the engine to said structure, the transmission system comprising:
- a shaft arrangement interposed between the engine and said structure;
- a planetary gearing supported by the shaft arrangement; and
- a transmission unit arranged in parallel to the shaft arrangement and engaged with the shaft arrangement at a region of the shaft arrangement upstream of the structure;

wherein the torque transmitted to said structure is estimated based on:
- torque upstream of the transmission system;
- twist of the shaft arrangement between further regions of the shaft arrangement upstream and downstream of the region of the shaft arrangement; and
- a parameter which is indicative of the ratio between an output rotational speed at an output of the transmission unit and an input rotational speed at an input of the transmission unit, and wherein the estimated torque is used for activating a power booster to request the engine of the vehicle to provide more power.

2. A method according to claim 1, wherein the transmission unit comprises a hydrostatic unit, the hydrostatic unit including at least a hydraulic variable displacement pump.

3. A method according to claim 2, wherein the torque transmitted to said structure is estimated in certain working conditions represented by a working point, the method comprising a step of calculating a displaced position of the working point relative to a reference element, the reference element joining a plurality of points having a constant value of the torque transmitted to said structure.

4. A method according to claim 3, wherein the reference element is a reference surface in a three-dimensional space defined by the following axes: an axis of torque upstream of the transmission system; an axis of twist of the shaft arrangement; and an axis of said parameter.

5. A method according to claim 3, wherein the displaced position of the working point is calculated by subtracting a torque offset to the torque of the working point as measured upstream of the transmission system and by subtracting a twist offset to a measured value of twist in the working point, the value of said parameter for the working point being left unchanged, the torque offset and the twist offset defining how at least one threshold surface is positioned relative to the reference surface in a three-dimensional space, said at least one threshold surface joining a plurality of points for which torque downstream of the transmission system is equal to a threshold value.

6. A method according to claim 5, wherein said structure comprises a power take-off of the vehicle.

7. A method according to claim 6, wherein two threshold surfaces are taken into consideration, a first threshold surface corresponding to an on-threshold value of torque at the power take-off above which a power boost device is activated so as to provide additional power, a second threshold surface corresponding to an off-threshold value of torque at the power take-off below which the power boost device is deactivated.

8. A method according to claim 6, wherein said structure further comprises at least one auxiliary pump, and
when the power take-off is active, the estimated torque transmitted to said structure is indicative of torque transmitted to the power take-off;
when the power take-off is inactive, the estimated torque transmitted to said structure is indicative of torque transmitted to the auxiliary pump.

9. A method according to claim 3, wherein the reference element is a reference curve in a two-dimensional space defined by the following axes: an axis of torque upstream of the transmission system; an axis of twist of the shaft arrangement, said two-dimensional space being defined for a given value of said parameter.

10. A method according to claim 9, wherein an offset straight line can be defined in said two-dimensional space, the offset straight line showing how twist of the shaft arrangement varies as a function of torque upstream of the transmission system when the fraction of torque transmitted to the wheels is zero, the displaced position of the working point being calculated by rotating said two-dimensional space, so as to bring the offset straight line to coincide with the ordinate axis.

11. A method according to claim 10, wherein the following data are used as input elements for a table:
torque in the displaced position of the working point upstream of the transmission system, and
value of said parameter for the working point, said table giving as an output element a reference value of the twist which ensures that the torque transmitted to said structure is equal to said constant value.

12. A method according to claim 11, and further comprising a step of comparing the twist in the displaced position of the working point with the reference value of the twist as obtained from the table, in order to determine whether torque transmitted to said structure is greater than said constant value.

13. A method according to claim 11, and further comprising the following steps:
calculating a difference between the twist in the displaced position of the working point and the reference value of the twist;
dividing said difference by an elasticity coefficient which is indicative of elasticity of the transmission system, in order to estimate torque transmitted to said structure.

14. A method according to claim 10, wherein said parameter is used as an input element for a table, the table giving as an output a coefficient establishing a relationship between torque generated by the engine and twist of the shaft arrangement, so that a reference value of the twist which ensures that the torque transmitted to said structure is equal to said constant value can be calculated by multiplying said coefficient by torque in the displaced position of the working point upstream of the transmission system and then adding a constant value.

15. A method according to claim 1, wherein a torque difference is calculated between the torque estimated at said structure and the torque generated by the engine, said torque difference being divided by a transmission ratio in order to calculate the fraction of torque transmitted to the wheels of the vehicle.

16. A transmission system comprising:
a shaft arrangement configured to be interposed between an engine and a structure, the shaft arrangement comprising an input and an output;
a planetary gearing supported by the shaft arrangement; and
a transmission unit arranged in parallel to the shaft arrangement and engaged with the shaft arrangement at a region of the shaft arrangement upstream of the structure;
wherein the torque transmitted at the output of the shaft arrangement is estimated based on:
torque upstream of the transmission system;
twist of the shaft arrangement between further regions of the shaft arrangement upstream and downstream of the region of the shaft arrangement; and
a parameter which is indicative of the ratio between an output rotational speed at an output of the transmission unit and an input rotational speed at an input of the transmission unit, and
wherein the estimated torque is for use for activating a power booster to request the engine to provide more power.

17. The transmission system of claim 16, wherein the transmission unit comprises a hydrostatic unit including at least a hydraulic variable displacement pump.

18. The transmission system of claim 17, wherein the torque transmitted at the output of the shaft arrangement is estimated in certain working conditions represented by a working point, and a displaced position of the working point relative to a reference element is calculated, the reference element joining a plurality of points having a constant value of the torque transmitted at the output of the shaft arrangement.

19. The transmission system of claim 17, wherein the reference element is a reference surface in a three-dimensional space defined by the following axes: an axis of torque upstream of the transmission system; an axis of twist of the shaft arrangement; and an axis of said parameter.

20. The transmission system of claim 17, wherein the displaced position of the working point is calculated by subtracting a torque offset to the torque of the working point as measured upstream of the transmission system and by subtracting a twist offset to a measured value of twist in the working point, the value of said parameter for the working point being left unchanged, the torque offset and the twist offset defining how at least one threshold surface is positioned relative to the reference surface in a three-dimensional space, said at least one threshold surface joining a plurality of points for which torque downstream of the transmission system is equal to a threshold value.

* * * * *